US008407685B2

(12) United States Patent  (10) Patent No.: US 8,407,685 B2
Clark et al.  (45) Date of Patent: Mar. 26, 2013

(54) SYSTEMS AND METHODS FOR GENERATING ORDERED DOWNLOAD SELECTIONS BASED ON USAGE INFORMATION

(75) Inventors: Bryan W. Clark, Westford, MA (US); Owen W. Taylor, Westford, MA (US); Colin Walters, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 1041 days.

(21) Appl. No.: 12/032,039

(22) Filed: Feb. 15, 2008

(65) Prior Publication Data

US 2009/0210870 A1  Aug. 20, 2009

(51) Int. Cl.
*G06F 9/44* (2006.01)
*G06F 15/173* (2006.01)
(52) U.S. Cl. ........................... 717/168; 709/224
(58) Field of Classification Search .................... 717/178
See application file for complete search history.

(56) References Cited

U.S. PATENT DOCUMENTS

| | | | |
|---|---|---|---|
| 5,842,023 A * | 11/1998 | Tsumura | 717/170 |
| 6,301,710 B1 * | 10/2001 | Fujiwara | 717/175 |
| 6,606,744 B1 * | 8/2003 | Mikurak | 717/174 |
| 6,629,138 B1 * | 9/2003 | Lambert et al. | 709/224 |
| 6,751,794 B1 * | 6/2004 | McCaleb et al. | 717/168 |
| 6,918,113 B2 * | 7/2005 | Patel et al. | 717/178 |
| 2007/0094083 A1 * | 4/2007 | Yruski et al. | 705/14 |
| 2008/0059348 A1 * | 3/2008 | Glassman et al. | 705/35 |
| 2008/0066080 A1 * | 3/2008 | Campbell | 719/314 |
| 2009/0158274 A1 * | 6/2009 | Roberts | 717/178 |
| 2009/0210870 A1 * | 8/2009 | Clark et al. | 717/178 |
| 2009/0276771 A1 * | 11/2009 | Nickolov et al. | 717/177 |
| 2010/0023640 A1 * | 1/2010 | Vinson et al. | 709/231 |

* cited by examiner

*Primary Examiner* — Don Wong
*Assistant Examiner* — Mohammad Kabir
(74) *Attorney, Agent, or Firm* — Lowenstein Sandler LLP

(57) ABSTRACT

Embodiments relate to a platform for generating ordered download selections based on usage information. A download site can provide a selectable or searchable set of applications to download. The download site collects usage information from online desktops operating on a set of clients. The online desktop of each client samples the applications being used on the client at given intervals and reports the client's usage statistics to the download site. The download site aggregates the usage information received from participating clients and collectively orders applications for download, according to usage rank. A work processing application used by the most users in the last day or other period may be listed first, followed by the second-most used, and so forth. The sampling of actual application usage, instead of for instance download totals, allows the download site to provide downloads in an order most closely approximating users' actual usage behavior.

21 Claims, 4 Drawing Sheets

SYSTEMS AND METHODS FOR GENERATING ORDERED DOWNLOAD SELECTIONS BASED ON USAGE INFORMATION

FIELD

Embodiments herein relate to systems and methods for generating and delivering selectable download lists for applications or other software, and more particularly to platforms and techniques for presenting selectable applications ranked by collective usage.

BACKGROUND OF RELATED ART

Internet download sites can present a user with a set of applications or other software to download and install. The list of applications can be broken out by selectable categories according to application type, such as spreadsheets, email clients, or word processing programs. The download site can also present the user with a search dialog to receive user input to search for applications by name or type.

When a user is presented with a list of applications to view and potentially select and download, the list must be presented in some defined order. At some download sites, the list of applications can be presented according to the total number of downloads already performed for that application from that site. At other download sites, the Web administrator or other manager may manually select an ordered list of applications to present to the user. However, ordering potential download candidates according to these various schemes can involve disadvantages. If a site manager manually selects the order in which applications are presented to users for selection, that order can represent little more than an intuitive estimate by the manager regarding which applications are most popular amongst existing users. If the list is ordered according to rank of total download numbers since the application was first posted (or other predetermined time), the list may fail to take into account such factors as multiple downloads by one or more users, the fact that download totals may spike around the time of a new release, or the fact that an application can be downloaded once and never used, or infrequently used. It may be desirable to provide methods and systems that present a list of application for download and installation based on proportions of actual usage by users, rather than download indicators that may or may not correspond to empirical usage rates.

DESCRIPTION OF THE DRAWINGS

The accompanying drawings, which are incorporated in and constitute a part of this specification, illustrate embodiments of the present teachings and together with the description, serve to explain principles of the invention. In the figures.

DESCRIPTION OF EMBODIMENTS

Figure 1:
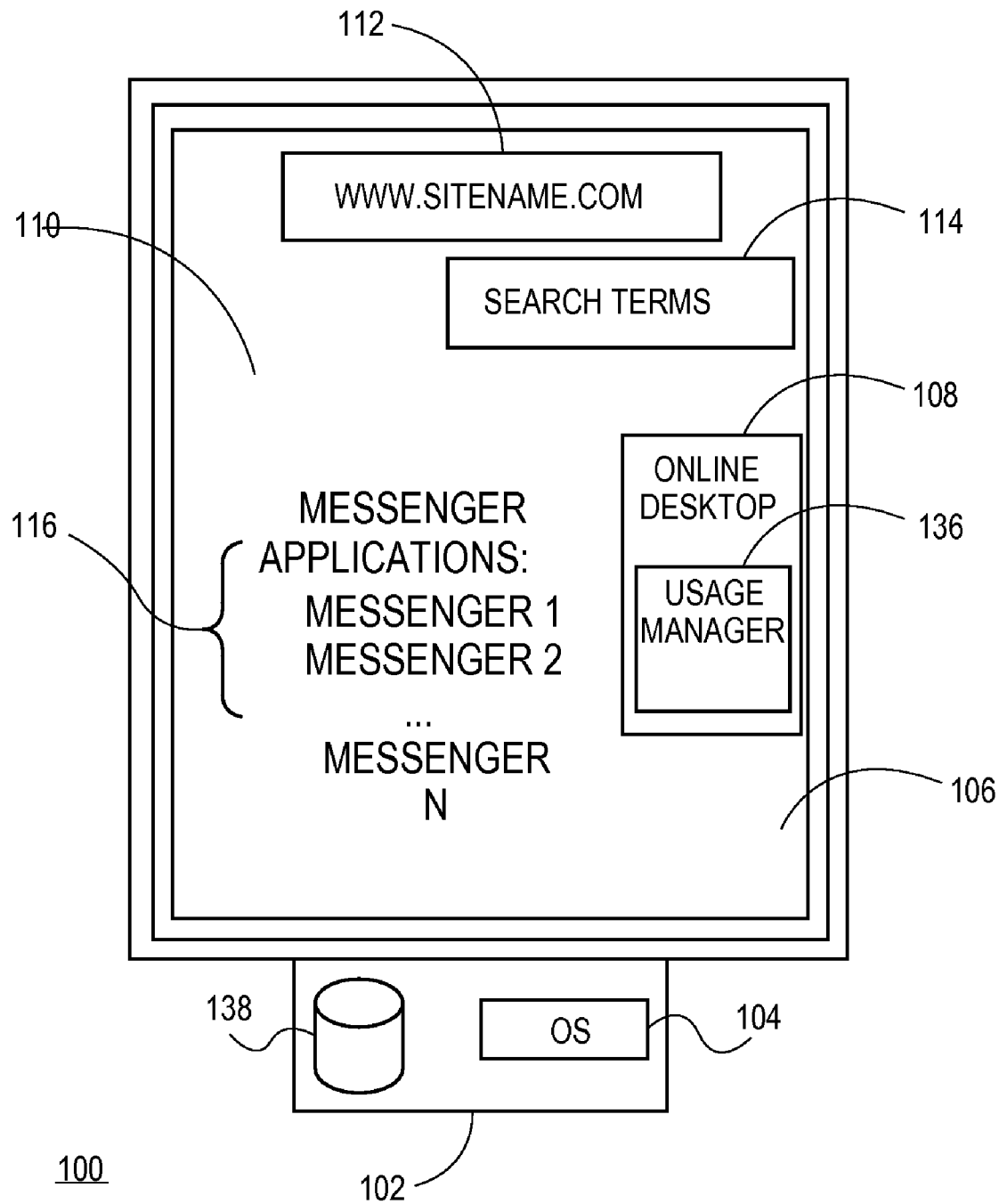
FIG. 1 illustrates a client system that can be used to receive download selections based on usage information, according to various embodiments of the present teachings.

Embodiments of the present invention relate to systems and methods for generating a set of ordered download lists based on collective usage information drawn from an overall usage community. More particularly, a download site, such as an Internet site, can provide a selectable or searchable set of applications to download. The download site can list or enumerate applications or other software by categories, such as word processing applications, messenger applications, email client applications, or other types of applications or other software. The download site can, in cases, likewise provide a search function for the user to input the name or type of application to search for and download.

As part of the process of generating an ordered list of selectable applications for download, the download site collects usage information from online desktops operating on a set of distributed clients. The online desktop of each client samples the applications being used on the client at given intervals, such as every hour or day, and reports that individual client's usage information to the download site, identifying applications executing on the client at the time the sampling was performed. The download site aggregates the usage information received from all of the participating clients, and generates total numbers of applications being used. The download site then collectively orders the list of applications for download according to that generated usage rank. A word processing application, email client application, or other type of application or software used by the greatest number of users in the last day, week, or other interval may be listed first, followed by the second-most used of the same type, followed by the third-most used of the same type, and so forth. The aggregate usage statistics can be used to generate a ranking or ordering of applications within different application categories based on the empirical usage of the applications, as monitored by the download site. In embodiments, applications can also be ordered on an overall usage basis across all application types, on combined application types, or based on other collective statistics or comparisons. The sampling of actual application usage, instead of, for example, accumulated download totals without regard to usage, allows the download site to provide downloads in an order most closely approximating users' overall behavior, based on the applications they actually choose to run to perform desired tasks. Embodiments of the present teachings in one regard collect and track multiple data points regarding the population of executing applications from a collection of clients over time, rather than a download total representing download activity that occurs a single time.

Reference will now be made in detail to exemplary embodiments of the invention, which are illustrated in the accompanying drawings. Where possible the same reference numbers will be used throughout the drawings to refer to the same or like parts.

FIG. 1 illustrates an overall system 100 for generating ordered download selections based on usage information, consistent with the present teachings. A user can operate a client 102, such as a personal computer, network-enabled cellular telephone, or other device. Client 102 runs an operating system 104. Operating system 104 can be an open-source operating system such as a Linux™ distribution, the Unix™ operating system, a proprietary operating system such as the Windows™ family of operating systems, or other operating system or platform. Operating system 104 can generate, present and manage a user interface 106 to accept user inputs, commands, and input/output operations. User interface 106 can be or include a graphical user interface, a command line interface, a voice-activated or touch-screen interface, or other interface. Client 102 can execute an online desktop 108. Online desktop 108 can be an interface or tool that organizes and manages a user's interaction with local and remote resources, including other users, remote files, applications and Web services accessed over network connections via a browser or other application. Client 102 can incorporate a local data store 138, such as a database stored on a local hard drive.

Online desktop 108 more particularly can incorporate a usage manager module 136 that is configured to detect and record the applications that are executing on client 102 at predetermined intervals. Usage manager module 136 can, for example, identify executing applications or other software using a "gnome-system-monitor" or a "Ksysguard" command under Linux™ installations, or by accessing other commands, services, or ports of operating system 104. Usage manager module 136 can interrogate or poll operating system 104 at predetermined intervals to collect information regarding running applications, such as at intervals of every minute, every hour, every day, or at other intervals. In embodiments, usage manager module 136 can poll operating system 104 at random or irregular intervals to identify running applications. In further embodiments, usage manager module 136 can poll operating system 104 to identify running applications based on one or more triggering events, such as detection of predetermined application usage thresholds or patterns on client 102.

Figure 2:
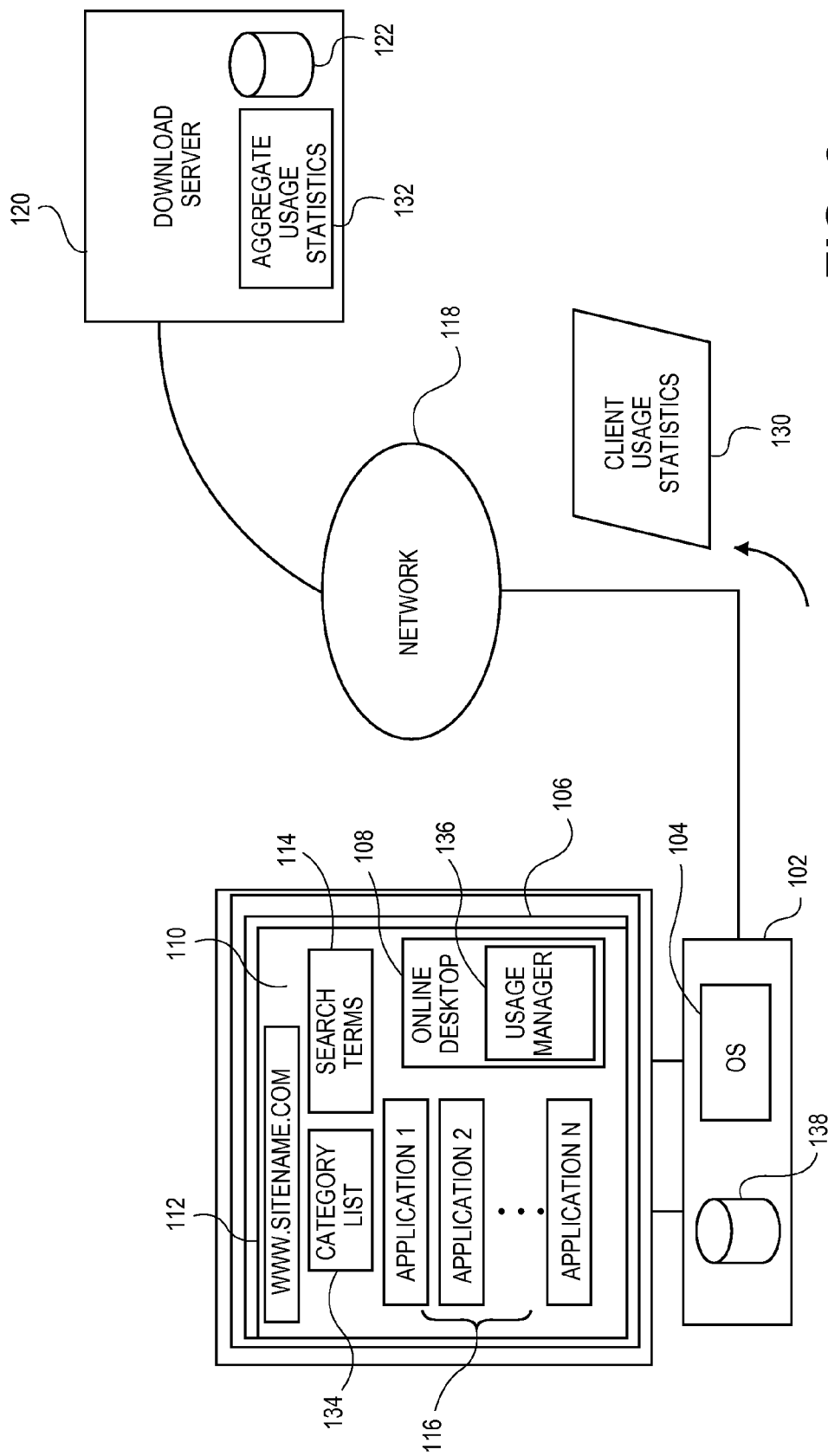
FIG. 2 illustrates an overall system for generating ordered download selections based on usage information including network resources, according to various embodiments.

As illustrated for example in FIG. 2, when a set of one or more executing applications is identified, usage manager module 136 of online desktop 108 transmits the identity of those applications to download server 120 as client usage information 130. Client usage information 130 can contain other information in addition to the names or identities of executing applications, including for instance an IP (Internet protocol) address for client 102, a date/time stamp for the application information collected from client 102, the period of time an application has been running, or other data or attributes of the applications executing on client 102.

As likewise shown in FIG. 2, a user operating client 102 can navigate via network 118 to a download site 110, such as a Web site that hosts a set of downloadable applications, utilities, widgets, drivers, or other software. Download site 110 can be identified or located by a uniform resource locator (URL) 112, such as a Web address in "http://www.websitename.com" format. Download site 110 can be hosted or operated on a download server 120 communicating with a download database 122, such as a relational database or other data store storing a set of application images. Download database 122 can store a set of applications, utilities, drivers, widgets, or other software for download to client 102, for instance via file transfer protocol (ftp), peer-to-peer, or other protocols or connections. In addition to hosting a set of downloadable applications, download server 120 can collect the client usage information 130 from a set of distributed clients communicating via network 118 having an online desktop 108, including usage manger module 136, or other interface or service registered with download server 120. Download server 120 can receive the individual client usage information 130 from the set of clients communicating over network 118, to generate aggregate usage information 132 reflecting a snapshot of running applications across the entire set of clients being monitored. Aggregate usage information 132 is then used by download server 120 to generate an ordered list 116 of applications from which the user can make selections for download.

More particularly, as likewise shown in FIG. 2, download site 110 can provide a display or interface for a user to locate and download software that the user wishes to download to client 102. The interface can include a search dialog 114, a category list 134, or both. Search dialog 114 can include an input box to receive search terms entered by the user to locate a desired application, file, or other software. A user can for instance input an application type such as "browser," "email," or "spreadsheet" in search dialog 114. The user can also specify application names, such as "Firefox™" for a browser application. Instead of or in addition to presenting a search dialog 114, download site 110 can present a category list 134 of applications available for selection and download, broken out by application type.

According to embodiments in one regard, download site 110 can generate an ordered list 116 of applications available for download to a user via search dialog 114 and/or category list 134, based on aggregate usage information 132. Download server 120 of download site 110 can access aggregate usage information 132 to build ordered list 116 in order of rank of combined usage of applications matching the user's search or selection. For instance, if a user enters a search term "browser" in search dialog 114, download server 120 can build a list of browser applications as ordered list 116 in which the most-used browser, Browser 1, is listed first, followed by the second-most used browser, Browser 2, listed next, followed by the third-most used browser, Browser 3, and so forth. In embodiments the user can also search on or select attributes of a desired program, such as programs compatible with specified types or versions of operating system 104. In embodiments the user can select one or more applications from ordered list 116 to install on client 102.

According to embodiments, selected applications can be installed via an extension to a browser operating on client 102 which only permits access from download site 110. Download site 110 can transmit or invoke JavaScript™ or other code to request the installation of a specific application. The selected application can be identified by an application ID or other code. It may be noted that different clients may be loaded with different types or versions of operating system 104, and those different types or versions can use different application IDs. According to embodiments, download site 110 can therefore store a mapping of the application ID or other identifiers employed by download site 110 to those used by different types or versions of operating system 104, to facilitate consistent identification of applications. In addition to or instead of search-based selection, a user can select a category such as "Browser" from category list 134, and a list of browsers by usage, similarly in order of Browser 1, Browser 2, Browser 3, etc., can be presented. In embodiments, category list 134 can present applications in usage-ranked order, before any further search or selection action by the user.

According to embodiments, download server 120 can generate ordered list 116 at predetermined intervals or frequencies, such as once every hour, day, or other time period. In embodiments, download server 120 can generate ordered list 116 at random or irregular intervals. In further embodiments, download server 120 can generate ordered list 116 based on triggering events, such as the detection of a predetermined threshold of client usage information 130 received from reporting clients. It may be noted that in embodiments the intervals, frequencies, and/or times at which various clients sample and/or report their local client usage data 130 to download server 120 can be the same or can be different from that of other clients. Similarly, in embodiments the intervals, frequencies, and/or times at which download server 120 generates ordered list 116 can be synchronized or related to the intervals, frequencies, and/or times at which the set of clients report client usage information 130, or can be independent of those time points.

After download server 120 has generated ordered list 116 and presented that list to user on client 102, the user can select one or more of the presented applications for downloading and/or installation to client 102 or other device. When the selected application is installed it is registered to operating system 104, and can thereafter similarly be tracked by online desktop 108 to generate client usage information 130 that is reported to download server 120, or other destination.

Figure 3:
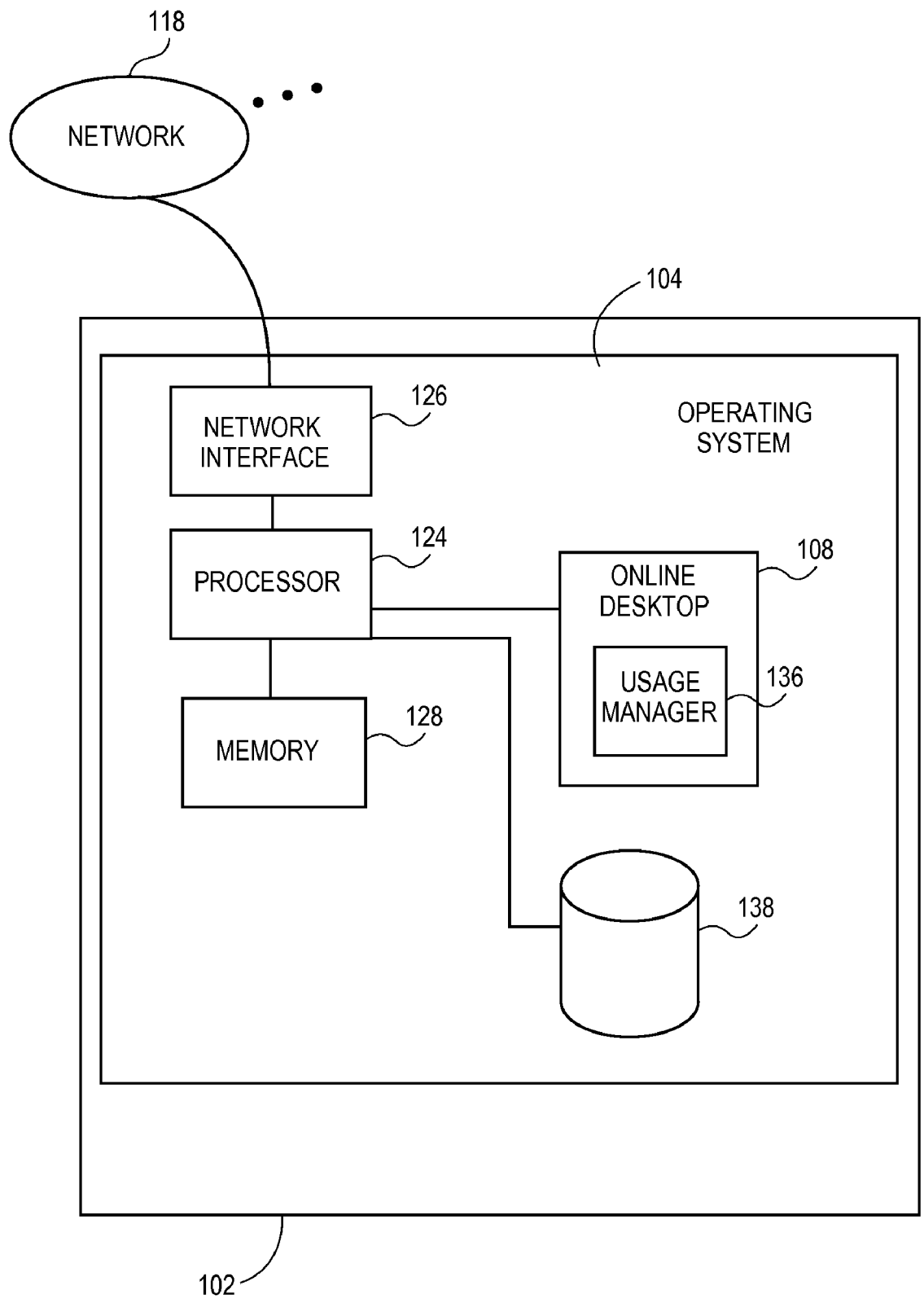
FIG. 3 illustrates a schematic diagram of a hardware configuration of a client that can be used to receive download selections based on usage information, according to various embodiments.

FIG. 3 illustrates a schematic hardware configuration that can be used in conjunction with a platform for generating ordered download selections, according to various embodiments. As shown, a processor 124 can communicate with memory 128, such as electronic random access memory (RAM), to execute software including operating system 104. Processor 124 is connected to data store 138, such as a local database stored on a hard drive. Processor 124 is also connected with a network interface 126, such as an Ethernet, optical, wireless, or other connection or interface. Network interface 126 in turn communicates with network 118, such as the Internet or private networks, to transmit and/or receive information including client usage information 130, aggregate usage information 132, interface information, and/or any selected applications or other software for download. In embodiments, applications selected for download can be downloaded directly to a requesting client 102, or can be directed to other destinations.

Figure 4:
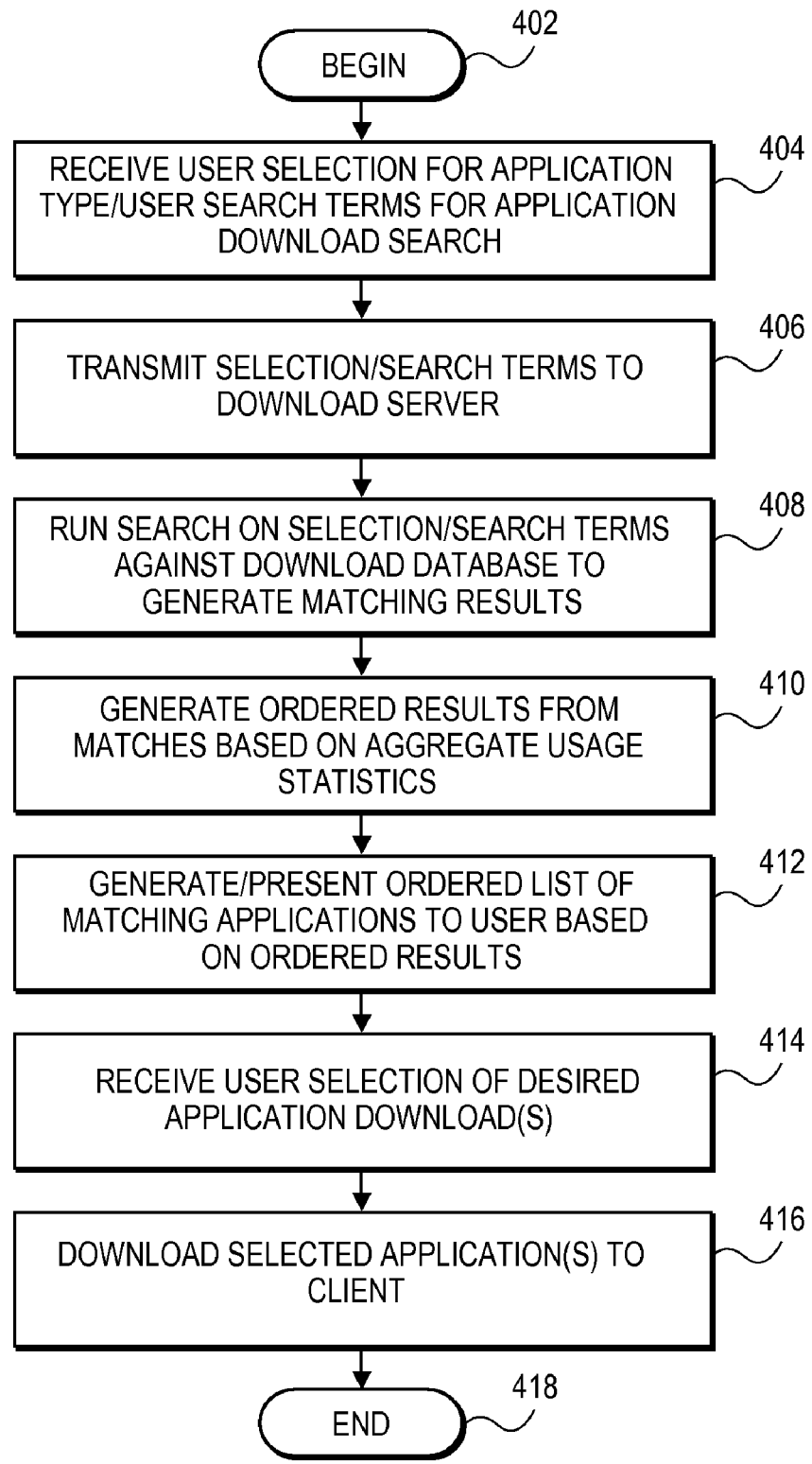
FIG. 4 illustrates a flowchart of overall processing to generate an ordered set of application selections, according to various embodiments.

FIG. 4 illustrates a flowchart of overall processing for generating ordered download selections based on usage information, according to embodiments. In step 402, processing can begin. In step 404, a user's selection from a download selection list for a particular application type, or a user's set of application search terms to locate a desired application, can be received from client 102 by download server 120 of download site 110. The user can for example operate a Web browser on client 102 to navigate to download site 110 and enter selections or search terms. In step 406, the user's selection or search terms can be transmitted to download database 122 or other application data store. In step 408, download server 120 can run a search against download database 122 based on the received user selection or search terms, to identify applications matching the selection or terms.

In step 410, the download server 120 orders or ranks the results of the search against download database 122 based on the aggregate usage information 132 sampled from the set of clients whose online desktop 108 periodically reports the running of various applications to download site 110. Thus download server 120 may detect that the user has entered the search terms "email client," and determine that Email Client 1 has had 250,000 users in the last week, Email Client 2 has had 100,000 users in the last week, while Email Client 3 has had 50,000 users in the last week, and so forth for each application of that type that is registered to download database 122. The set of applications or other software ranked according to aggregate usage information by download server 120 is output as ordered list 116.

In step 412, download server 120 transmits the ordered list 116 to the client 102 of the requesting user and presented to the user, for instance via user interface 106 as a selectable or linkable list of applications. In step 414, any selection by the user of one or more applications presented in ordered list 116 can be received at download site 110 by download server 120, indicating those applications or other software the user wishes to download and/or install. In step 416, the selected applications are downloaded to client 102 from download server 120. In embodiments, the downloading of the selected applications can be scheduled for a later time. In step 418, processing can repeat, return to a prior processing point, jump to a further processing point, or end, as understood by persons skilled in programming arts.

The foregoing description is illustrative, and variations in configuration and implementation may occur to persons skilled in the art. For example, while embodiments have been described in which applications are download via a single download site from a single download database, in embodiments the download activity can take place at two or more download sites. In embodiments incorporating multiple download sites, the aggregate usage information collected by the various download servers can be combined to develop a composite set of aggregate usage information upon which download lists can be generated. Similarly, while embodiments have been described in which applications are downloaded from a single database, in embodiments the set of applications that are available to be downloaded can be stored in two or more separate databases or other data stores. Other resources described as singular or integrated can in embodiments be plural or distributed, and resources described as multiple or distributed can in embodiments be combined.

For further example, while embodiments have been described in which the ordered list of applications is generated in response to a user search or selection of applications for download, in embodiments the presentation of an ordered list can be triggered by other activity. For instance, when a user attempts to open a file or attachment, in embodiments the operating system or other logic can query the user to select an application to use or associate with files of a given extension. In embodiments, the dialog for opening a file can incorporate a list of potential applications to use to open a file that is ordered based on tracked usage information for files of the given type. Yet further, while embodiments have been described with respect to selecting, searching, and ordering various types of discrete downloadable applications, in embodiments other types of software, for example, device drivers, utilities, widgets, add-ons, or other objects, can be sampled for usage and ranked based on frequency of usage. The scope of the invention is accordingly intended to be limited only by the following claims.

What is claimed is:

1. A method comprising:
    aggregating, by a download server, usage information received from a set of clients indicating whether at least one of a set of software applications installed on the set of clients is running based on a determination performed at an irregular interval or a predetermined interval;
    receiving, by the download server from a client, at least one of user-specified selection, attribute or search term indicating a plurality of matching software applications from the set of software applications;
    generating, by the download server, an ordered list of the plurality of matching software applications for selectable download based on the aggregated usage information and the at least one of the user-specified selections, attribute or search term; and
    providing the client, by the download server, at least one of the plurality of matching software applications based on a selection from the ordered list.

2. The method of claim 1, wherein the predetermined interval comprises an interval of one day or less.

3. The method of claim 1, wherein the usage information is generated by an online desktop operating on a respective client.

4. The method of claim 1, wherein generating the ordered list is repeated at a predetermined interval.

5. The method of claim 4, wherein the predetermined interval for generating the ordered list comprises an interval of one hour or greater.

6. The method of claim 1, wherein generating the ordered list is triggered by detection of network conditions.

7. The method of claim 6, wherein the network conditions comprise receipt of a threshold amount of usage information.

8. A system comprising:
a data store to store a set of software applications available for downloading;
a download server, the download server communicating with the data store, the download server being configured to:
aggregate usage information from a set of clients indicating whether at least one of a set of software applications installed on the set of clients is running based on a determination performed at an irregular interval or a predetermined interval,
receive, from a client, at least one of a user-specified selections, attribute or search term indicating a plurality of matching software applications from the set of software applications,
generate an ordered list of the plurality of matching software applications for selectable download based on the aggregated usage information and the at least one of the user-specified selection, attribute or search term, and
provide, to the client, at least one of the plurality of matching software applications based on a selection from the ordered list to the client.

9. The system of claim 8, wherein the predetermined interval comprises an interval of one day or less.

10. The system of claim 8, wherein the usage information is generated by an online desktop operating on a respective client.

11. The system of claim 8, wherein the download server generates the ordered list at a predetermined interval.

12. The system of claim 8, wherein the predetermined interval for generating the ordered list comprises an interval of one hour or greater.

13. The system of claim 8, wherein the generation of an ordered list by the download server is triggered by detection of network conditions.

14. The system of claim 13, wherein the network conditions comprise receipt of a threshold amount of usage information.

15. A client system comprising:
a set of locally installed software;
a network interface to a remote data store of a download server; and
a usage manager computer module executable by a processor, the usage manager computer module registering usage information for the set of locally installed software transmitting the usage information to a remote data store of the download server via the network interface for aggregation by the download server with usage information received from one or more other client systems, receiving an ordered list identifying a plurality of software applications via a download form the download server based at least in part on the aggregated usage information, receiving a download of at least one software application selected from the ordered list.

16. The client system of claim 15, wherein the usage information comprises an indication of currently executing software in the set of locally installed software.

17. The client system of claim 15, wherein the usage manager computer module samples the currently executing software at a predetermined interval comprising an interval of one day or less.

18. A non-transitory computer-readable medium, the computer-readable medium being programmed to execute a method comprising:
generating usage information in a client system indicating whether at least one of a set of software applications installed on the client system is running based on a determination performed at an irregular interval or a predetermined interval;
transmitting, by the client system, the usage information to a download server at a predetermined interval for aggregation by the remote download server with usage information received from a plurality of client systems to produce aggregated usage information;
receiving, by the client system, at least one of a user-specified selection, attribute or search term indicating a plurality of matching software applications to be downloaded;
receiving, by the client system, an ordered list of the plurality of matching software applications via a download from the download server based at least in part on the aggregated usage information and the at least one of the user-specified selection, attribute or search term;
presenting, by the client system, the ordered list of the plurality of matching software applications to the user for selectable download; and
receiving, by the client system, a download of at least one of the plurality of matching software applications based on a selection form the ordered list.

19. The non-transitory computer-readable medium of claim 18, wherein the aggregated usage information comprises usage information from the plurality of client systems reporting an execution state of the set of software applications.

20. The non-transitory computer-readable medium of claim 19, wherein the generating usage information is performed via an online desktop.

21. The non-transitory computer-readable medium of claim 19, wherein the generating usage information is repeated at a predetermined interval.

* * * * *